US008243122B2

(12) United States Patent
Ishikawa et al.

(10) Patent No.: US 8,243,122 B2
(45) Date of Patent: Aug. 14, 2012

(54) VIDEO METHOD FOR GENERATING FREE VIEWPOINT VIDEO IMAGE USING DIVIDED LOCAL REGIONS

(75) Inventors: Akio Ishikawa, Saitama (JP); Shigeyuki Sakazawa, Saitama (JP); Atsushi Koike, Saitama (JP)

(73) Assignee: KDDI Corporation, Tokyo (JP)

( * ) Notice: Subject to any disclaimer, the term of this patent is extended or adjusted under 35 U.S.C. 154(b) by 1026 days.

(21) Appl. No.: 12/182,630

(22) Filed: Jul. 30, 2008

(65) Prior Publication Data

US 2009/0033740 A1 Feb. 5, 2009

(30) Foreign Application Priority Data

Jul. 31, 2007 (JP) ................................. 2007-199053

(51) Int. Cl.
*H04N 7/00* (2006.01)
(52) U.S. Cl. ................ 348/39; 348/42; 348/43; 348/44; 348/45; 348/46; 348/47; 348/48; 348/49
(58) Field of Classification Search .................... 348/39, 348/42–49
See application file for complete search history.

(56) References Cited

U.S. PATENT DOCUMENTS

| 5,742,331 | A  | * | 4/1998  | Uomori et al. ................. 348/51  |
| 5,990,935 | A  | * | 11/1999 | Rohlfing .......................... 348/39  |
| 6,118,414 | A  | * | 9/2000  | Kintz ............................... 345/7  |
| 6,757,422 | B1 | * | 6/2004  | Suzuki et al. .................. 382/154  |
| 6,774,898 | B1 | * | 8/2004  | Katayama et al. ............. 345/428  |
| 6,809,887 | B1 | * | 10/2004 | Gao et al. ....................... 359/725  |
| 7,260,274 | B2 | * | 8/2007  | Sawhney et al. .............. 382/284  |
| 7,420,750 | B2 | * | 9/2008  | Kuthirummal et al. ........ 359/726  |
| 7,889,196 | B2 | * | 2/2011  | Nomura et al. ................ 345/419  |
| 7,948,514 | B2 | * | 5/2011  | Sato et al. ........................ 348/46  |
| 2001/0043737 | A1 | * | 11/2001 | Rogina et al. .................. 382/154  |
| 2002/0110275 | A1 | * | 8/2002  | Rogina et al. .................. 382/154  |
| 2003/0011597 | A1 | * | 1/2003  | Oizumi ........................... 345/427  |
| 2003/0048354 | A1 | * | 3/2003  | Takemoto et al. .............. 348/51  |
| 2003/0071891 | A1 | * | 4/2003  | Geng ............................... 348/39  |
| 2005/0041737 | A1 | * | 2/2005  | Matsumura et al. ...... 375/240.01  |
| 2006/0192776 | A1 | * | 8/2006  | Nomura et al. ................ 345/419  |
| 2006/0215018 | A1 | * | 9/2006  | Fukushima et al. ............ 348/51  |
| 2007/0109300 | A1 | * | 5/2007  | Li ................................... 345/427  |
| 2007/0126863 | A1 | * | 6/2007  | Prechtl et al. ................... 348/43  |
| 2009/0315978 | A1 | * | 12/2009 | Wurmlin et al. ................. 348/43  |
| 2010/0079577 | A1 | * | 4/2010  | Matsumura et al. ............ 348/42  |
| 2011/0157319 | A1 | * | 6/2011  | Mashitani et al. .............. 348/49  |

FOREIGN PATENT DOCUMENTS

| JP | 10-111951 A   | 4/1998 |
| JP | 2004-258775 A | 9/2004 |
| JP | 2008-15756 A  | 1/2008 |

\* cited by examiner

*Primary Examiner* — Alina N. Boutah
(74) *Attorney, Agent, or Firm* — Westerman, Hattori, Daniels & Adrian, LLP

(57) ABSTRACT

The present invention provides a method of generating a virtual viewpoint video image when the virtual viewpoint position is not located on a plane where a camera is disposed. In an environment in which a plurality of cameras having a horizontal optical axis are disposed in a real zone (for example, on the circumference) which surrounds an object, a video image of an arbitrary viewpoint on the circumference is generated. Further, by synthesizing video images photographed by a camera, a free viewpoint video image is generated from a virtual viewpoint (viewpoint from a high or low position) where no camera is placed. According to a method of achieving this, a travel distance of a display position is calculated by the local region synthesizing portion and this travel distance is reflected to the free viewpoint video image of a local region.

3 Claims, 10 Drawing Sheets
(3 of 10 Drawing Sheet(s) Filed in Color)

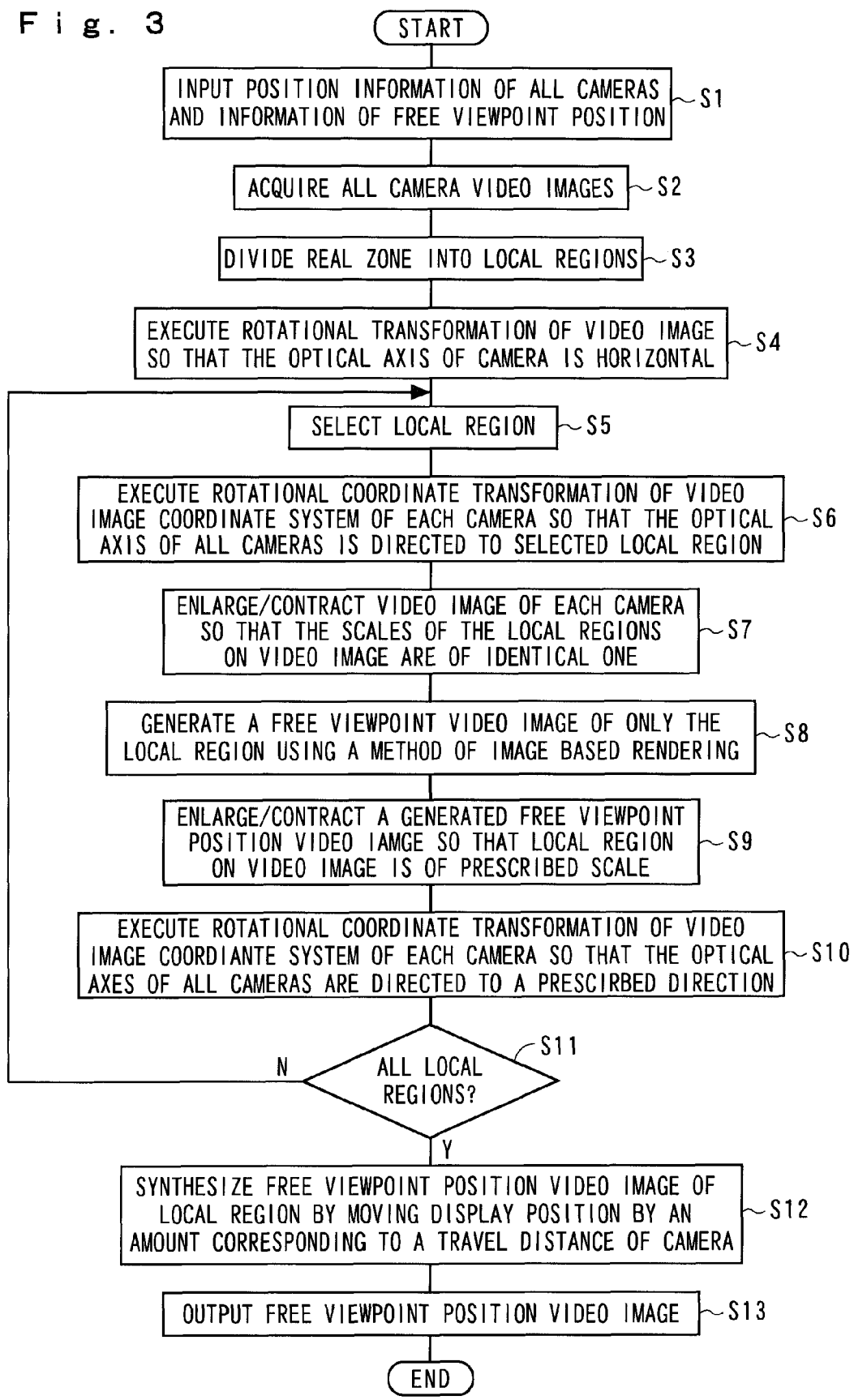

VIDEO METHOD FOR GENERATING FREE VIEWPOINT VIDEO IMAGE USING DIVIDED LOCAL REGIONS

BACKGROUND OF THE INVENTION

1. Field of the Invention

The present invention relates to a method for generating free viewpoint video image using divided local regions and more particularly to a method for generating a free viewpoint video image using images of an object photographed with a plurality of video cameras (hereinafter referred to as just camera) having each horizontal optical axis so as to surround the object.

2. Description of the Related Art

With a progress of video processing technology and video communication technology in recent years, three-dimensional free viewpoint video image has been attracting public attention as a next-generation video content. Then, a technology of generating entire circumference free viewpoint video image using multi-viewpoints photographed by disposing video cameras around an object has been studied and developed.

In this case, if cameras are disposed densely around an object in order to cope with an arbitrary viewpoint, the number of the cameras is increased thereby raising cost, which is not achievable in reality. Thus, although a method of disposing the cameras sparsely around the object is adopted, in this case, a video image located between video cameras is not obtained.

To solve this defect, conventionally, there has been proposed a method of generating a video image from a viewpoint in which an object is not photographed with the cameras by interpolating a video image between images using image based rendering.

As a typical method for the image based rendering of interpolating between multi-viewpoint images, "ray space representation method" is available, which has been described in Japanese Patent Application Laid-Open (JP-A) Nos. 2004-258775 and 10-111951 as technical documents which describe generation of interpolated video image using the ray space representation method.

However, when objects are distributed in a wide range in a real zone and parallax due to a difference in depth (depth parallax) is large, if it is intended to correct that depth parallax by the above-mentioned prior art, interpolation processing of ray information becomes complicated, which is not an actual solution.

Accordingly, the applicant has invented and filed an invention in which the real zone is divided into small local regions in which the depth parallax can be neglected and by applying the method of image based rendering to each divided local region individually, a local area free viewpoint video image is generated and then a target free viewpoint video image is generated by synthesizing those video images (Japanese Patent Application No. 2006-185648).

An outline of this invention will be described briefly with reference to FIG. 14. If it is assumed that an object video image photographed by one of plural cameras surrounding the object is (a) and a video image of a local region therein is (b), respective video images (c) in the local region photographed by the plural cameras is stored in ray space as ray information as shown in (d). Next, as shown in (e), interpolation of the ray information is carried out to charge the ray space. Next, as shown in (f), the ray information is cut out and the cut out ray information is synthesized as shown in (g) and by bring back this into the object video image region, a free viewpoint (virtual viewpoint) as shown in (h) is obtained.

According to this invention, even if objects are distributed in a wide range of real zone so that parallax due to a difference in depth is large, a video image of an arbitrary viewpoint in the real zone near the reality can be generated. Further, a video image can be generated from the virtual viewpoint between an object and other object so as to achieve walk-through experience.

However, in the above-mentioned application invention, the position of the virtual viewpoint is confined to a plane where a camera is disposed and if the virtual viewpoint is not located on that plane, for example, if the virtual viewpoint is moved upward or downward in the vertical direction with respect to the plane, the free viewpoint video image cannot be generated. In other words, if the camera is moved in the vertical direction with respect to the plane, the free viewpoint video image cannot be generated.

SUMMARY OF THE INVENTION

An object of the present invention is to provide a method for generating free viewpoint video image, capable of generating a free viewpoint video image as seen from a virtual viewpoint if the virtual viewpoint is not located on a plane where a camera is disposed.

In order to accomplish the object, a feature of the present invention resides in that a free viewpoint video image generating method which generates a video image of an arbitrary viewpoint using video images of a object photographed by a plurality of cameras, each having a horizontal optical axis disposed to surround the object, comprises a first step of dividing a real zone to local regions, a second step of transforming a camera coordinate system of the camera using an internal parameter of the camera within each of the local regions so that the optical axis of the camera is directed to the local region, a third step of enlarging or contracting the video image within the local region using information of distance between each of the cameras and the object, so that the scales of the local regions on the video image are arranged to an identical one, a fourth step of generating a free viewpoint video image only within the local region using a method of image based rendering within each of the local regions, a fifth step of enlarging or contracting the free viewpoint video image within each of the local regions so that the local region on the video image is of a prescribed scale, a sixth step in which the coordinate system of each camera is transformed using an internal parameter of the camera so that the optical axis of the camera is directed to a prescribed one, so as to obtain the free viewpoint video image of the local region and a seventh step of integrating the free viewpoint video image of each of the local region, wherein to generate a free viewpoint video image, viewed from a virtual viewpoint not located on the plane where the camera is disposed, a processing of moving the position of the virtual viewpoint video image of a local region within the free viewpoint video image synthesized finally corresponding to the position of the virtual viewpoint is carried out in the seventh step or a processing of moving the position Q of information of ray to be read corresponding to the position of the virtual viewpoint is carried out in the fourth step. According to the method for generating the free viewpoint video image of the present invention, even if the virtual viewpoint is moved in any direction three-dimensionally in the method for generating the free viewpoint video image by dividing the local region, a video image from that virtual viewpoint can be generated, thereby a free viewpoint video image having a higher realistic sensation being produced.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a flow chart showing the procedure of the first embodiment of the free viewpoint video image generating method of the present invention;

DETAILED DESCRIPTION OF THE PREFERRED EMBODIMENTS

Figure 1:
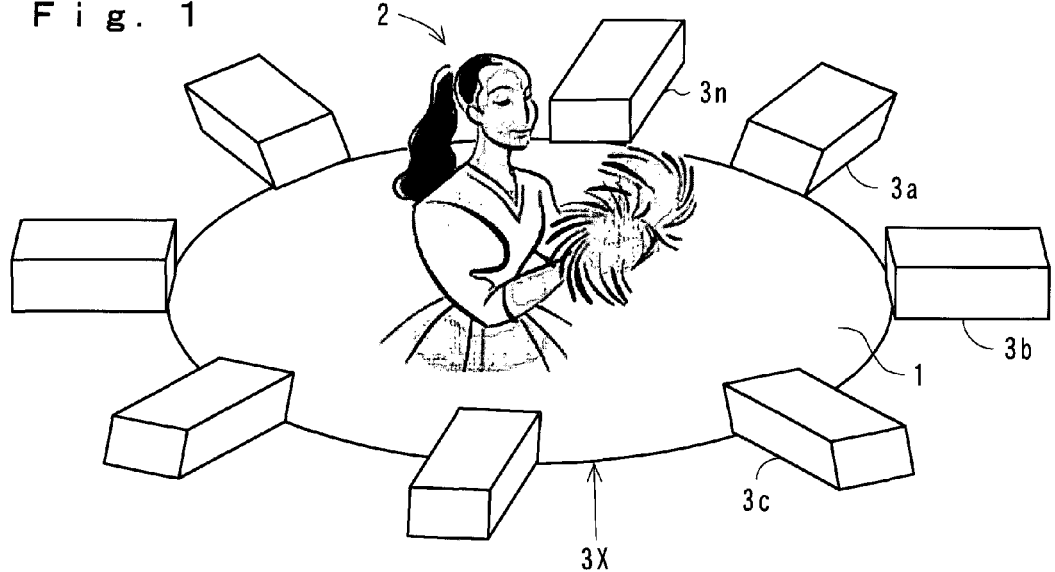
FIG. 1 is a schematic diagram of a photographing set for multi-viewpoint video in which cameras are disposed at a sparse interval.

Hereinafter, the present invention will be described in detail with reference to the drawings. FIG. 1 is a schematic diagram showing the positional relation between an object and a video camera (hereinafter referred to as just camera) according to an embodiment of the present invention.

As shown in the FIG. 1, a plurality of cameras $3a$, $3b$, $3c$, ... $3n$ each having a horizontal optical axis are disposed at a sparse interval on the outer periphery (for example, on the outer periphery of a polygon such as circle, ellipse, square) of a real zone 1 surrounding an object which is a photographing object 2. Assume that this object 2 has a nonnegligible depth parallax. The present invention intends not only to obtain a free viewpoint video image from a virtual viewpoint (for example, $3\times$) where no camera is placed, by synthesizing video images photographed by the cameras $3a$, $3b$, $3c$, ... $3n$, but also when a position of the virtual viewpoint does not exist on a plane where the cameras are disposed, obtain a free viewpoint video image at a virtual viewpoint position in case where it is assumed that the cameras $3a$, $3b$, $3c$, ... $3n$ and the virtual viewpoint $3\times$ are moved vertically.

Next, the structure of a free viewpoint video image generating apparatus 10 of the first embodiment of the present invention will be described with reference to a block diagram of FIG. 2.

First, the free viewpoint video image generating apparatus 10 includes a local region dividing portion 11 for dividing a real zone 1 (see FIG. 1) surrounding the object into a plurality of local regions, a camera position information/camera parameter acquiring portion 12 for acquiring position information of the plurality of the cameras $3a$, $3b$, $3c$ ... $3n$, virtual viewpoint position information and internal parameters of the camera and a video image acquiring portion 13 for acquiring video image information from the plurality of the cameras $3a$, $3b$, $3c$ ... $3n$. In the meantime, the detail of the function of the local region dividing portion 11 will be described with reference to FIG. 4 and FIG. 5 later.

A local region selecting portion 14 selects one of local regions divided by the local region dividing portion 11. A sight line rotation transformation portion 15 obtains each camera image of the selected local region from the video image acquiring portion 13 and executes rotational coordinate transformation of video image coordinate system of each camera so that video image in the local region is located in the center of the video image. An enlargement/contraction portion 16 executes enlargement or contraction processing of a video image of each camera in order to arrange sizes of objects to a uniform one because the size of the object differs depending on each viewpoint as the distance from the camera to the object is different respectively.

Figure 14:
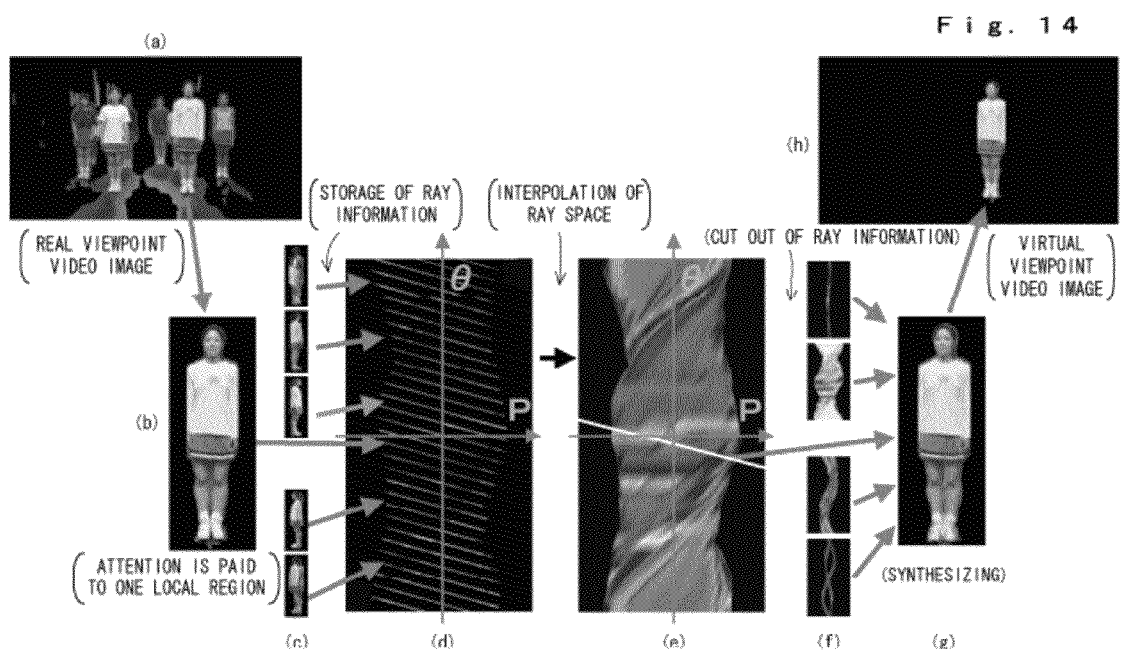
FIG. 14 is an explanatory diagram for explaining schematically the free viewpoint video image generating method of the above-mentioned application invention.

A free viewpoint video image generating portion 17 generates a free viewpoint image only in the local region using a method of image based rendering. Further, a video image of a virtual viewpoint position is extracted and memorized. In the meantime, an outline of the operation of the free viewpoint video image generating portion 17 is represented in FIG. 14($d$) to ($g$).

An inverted enlargement/contraction portion 18 enlarges or contracts the free viewpoint video image so that the local region on the video image becomes a prescribed scale. An inverted sight line rotational transformation portion 19 transforms each coordinate system of the camera using the internal parameter of the camera so that each optical axis of the camera is directed to a prescribed direction. When the function of the inverted sight line rotational transformation portion 19 is executed, other local region is selected by the local region selecting portion 14 and the same function as described previously is repeated.

If virtual viewpoint videos of all local regions are obtained by the above-described operation, a local region synthesizing portion 20 synthesizes free viewpoint video images of virtual viewpoints of the plural local regions obtained by the above-described structure. In this case, according to the present embodiment, the local region synthesizing portion 20 executes calculation processing $20a$ for a travel distance of a display position of the free viewpoint video image and video image generating processing $20b$ by synthesized representation. The calculation processing $20a$ calculates the travel distance of the display position of the free viewpoint video image caused by moving the cameras $3a$, $3b$, $3c$ ... $3n$ and/or the virtual viewpoint $3\times$ vertically while the detailed processing of the processings $20a$ and $20b$ will be described later. In the video image generating processing $20b$, the display position is moved upward or downward by an amount obtained by the calculation processing $20a$ to generate the free viewpoint video image and the generated video images are synthesized. A free viewpoint video image output portion 21 outputs a free viewpoint image (virtual viewpoint video) synthesized by the local region synthesizing portion 20.

Next, an outline of the function of the free viewpoint video image generating apparatus 10 will be described with reference to the flow chart of FIG. 3.

In step S1, position information of all cameras and internal parameter of the camera, for example, information about pixel transformation amount f of focal length and virtual viewpoint position are inputted. Assume that respective cameras have the same internal parameter. In step S2, video images of all the cameras are acquired. In step S3, the real zone 1 is divided to local regions. In step S4, if the optical axis of some camera is not horizontal, rotational transformation of the video image is carried out so that the optical axis of that camera becomes horizontal. In step S5, a local region is selected. In the meantime, the processing of step S4 may be carried out after step S5.

In step S6, the video image coordinate system of each camera is subjected to rotational coordinate transformation so that the optical axes of all the cameras are directed to the selected local region. In other words, the video image is subjected to rotational transformation so that local region is located in the center of the video image. In step S7, the video image of each camera is enlarged or contracted so that the scale of the local regions on the video image are arranged to an identical one.

In step S8, a free viewpoint video image only within the local region is generated by executing interpolation processing using the method of image based rendering. The detail of this processing will be described with reference to FIG. 10 to FIG. 11 later.

In step S9, a virtual viewpoint position video image is extracted from the free viewpoint video image and the extracted virtual viewpoint position video image is enlarged or contracted so that the local region on the video image is of the prescribed scale. In step S10, the video image coordinate system of each of the cameras is subjected to rotational coordinate transformation so that the optical axes of all the cameras are directed to a prescribed one. Consequently, the virtual viewpoint position video image of the selected local region is obtained.

Next, in step S11, whether or not the processing of all the local regions is terminated is determined and if there is some local regions not processed, the procedure is returned to step S5, in which another local region not processed is selected. If the processing to all the local regions is terminated in the above-described manner (the determination of step S11 is affirmative), the virtual viewpoint position video image of each local region is obtained. In next step S12, to obtain a free viewpoint video image in case where the camera is moved in a vertical direction, the display position of the virtual viewpoint position image is moved by a mount corresponding to the travel distance of the camera and then video images of all the local regions are synthesized. In step S13, the synthesized video image is outputted as a virtual viewpoint position video image.

Next, generation processing of the free viewpoint video image or virtual viewpoint position video image will be described in detail below.

Figure 4:
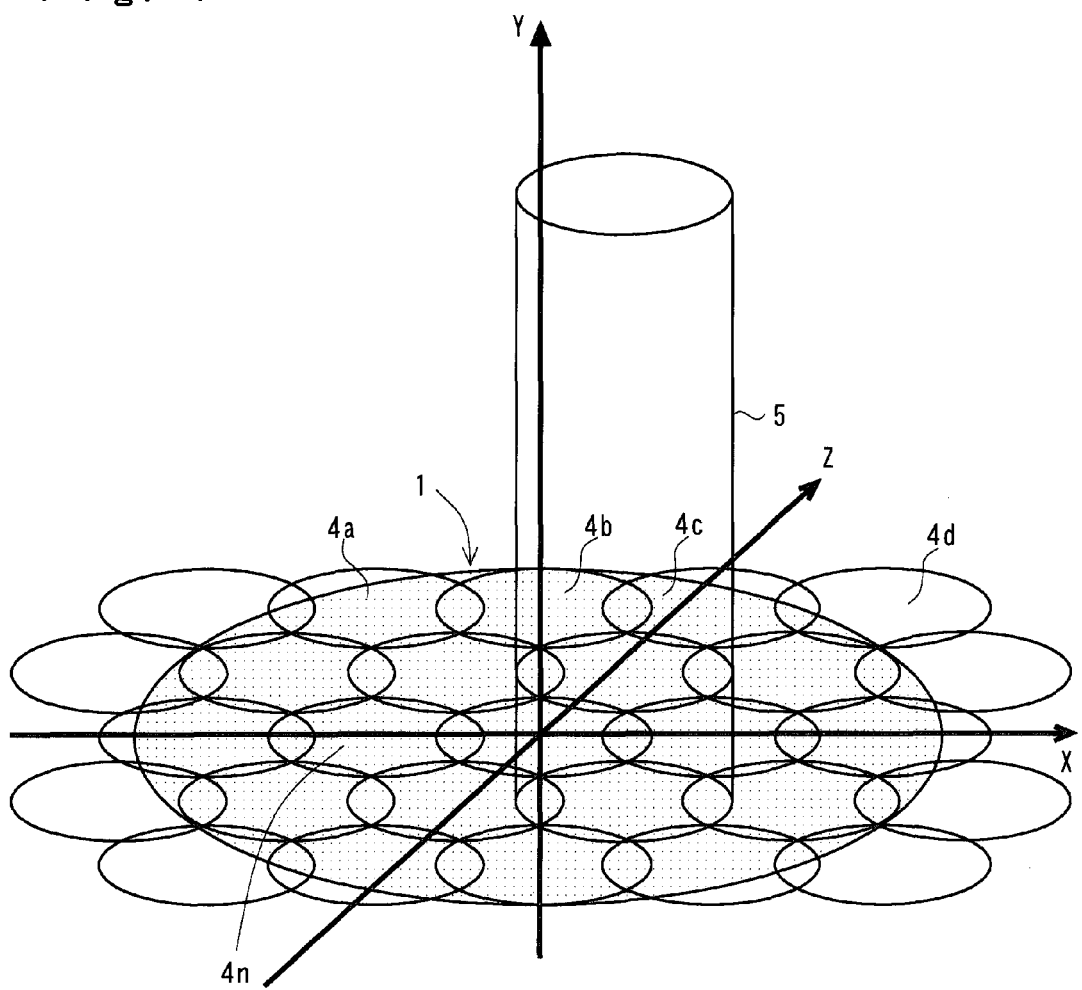
FIG. 4 is an explanatory diagram of an example of dividing a real zone into local regions.
Figure 5:
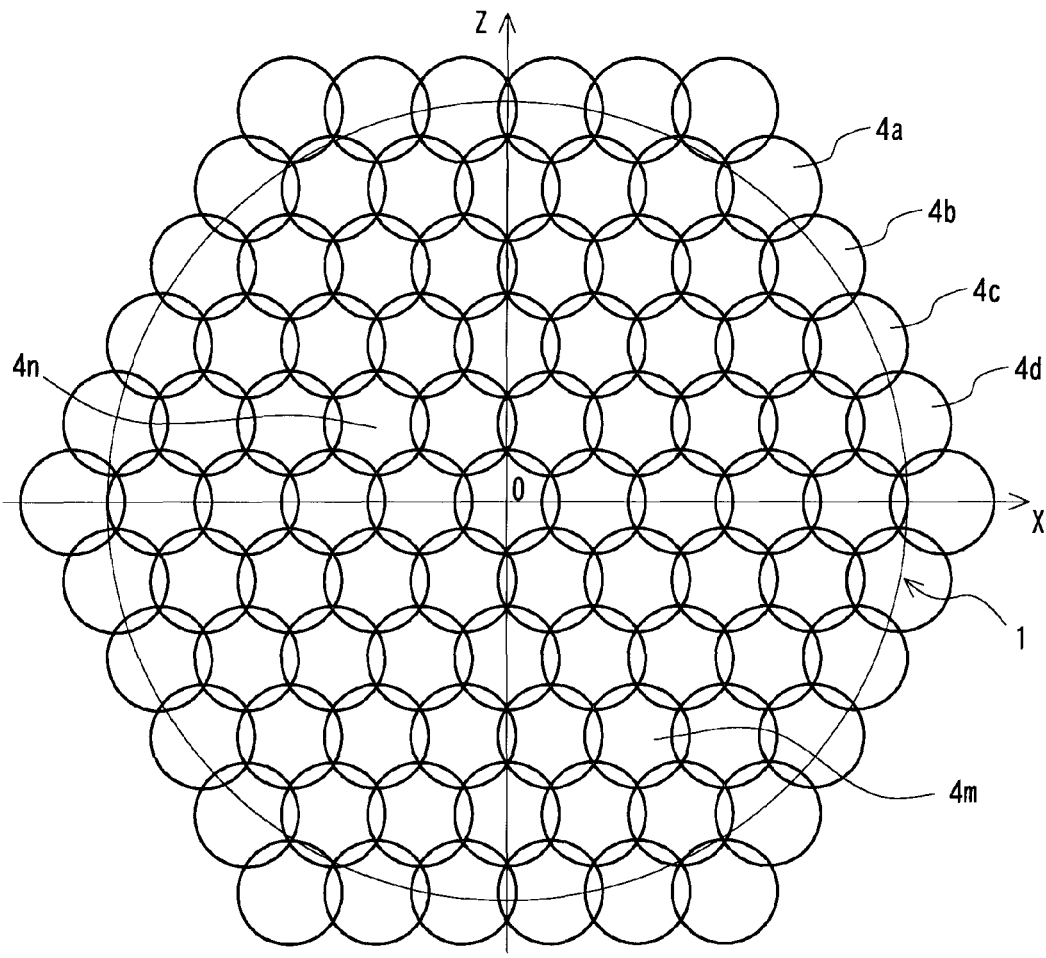
FIG. 5 is a diagram of a case where the divided local regions are viewed from above.

First, the real zone 1 is divided to local regions 4a, 4b, 4c, 4d, ... 4n as shown in FIG. 4 and FIG. 5. The divided local regions 4a, 4b, 4c, 4d, ... 4n are preferred to be of cylindrical form 5 as shown in FIG. 4. As represented in the same Figure, the local regions need to cover an entire photographed stage without any missing while an overlapped area is minimized.

Considering a case where the camera is disposed on the circumference for example, it is preferable that the central coordinate of each local region is divided into local regions expressed below.

$$\begin{pmatrix} \frac{\sqrt{3}}{2}ka \\ \frac{3}{2}la \end{pmatrix} \quad (3k^2a^2 + 91^2a^2 < 4R^2)$$

where a is (a) radius of a local region, (k) and (l) are arbitrary integers and (R) is a distance from the center to a camera.

As other example, considering a case where the cameras are disposed on a rectangular real zone 1, the coordinate of the center of each local region is preferred to be divided to local regions represented below.

$$\begin{pmatrix} \frac{\sqrt{3}}{2}ka \\ \frac{3}{2}la \end{pmatrix} \quad (3k^2a^2 + < H^2, 91^2a^2 < V^2)$$

where (a) is a radius of a local region, (k) and (l) are arbitrary integers, (H) is a width of a rectangular object area and (V) is a length of the rectangular object area. However, if (k) is odd, (l) is odd also, and if (k) is even, (l) is even also.

Unless the optical axis of the camera is not horizontal, the video image is subjected to rotational transformation so that the optical axis becomes horizontal.

If it is assumed that:

f: amount of pixel conversion of camera focal length [pixel]

$$\begin{pmatrix} u \\ v \end{pmatrix}:$$

digital video image coordinate of a point on original video image (home position or origin is a center of video image)

$$\begin{pmatrix} u' \\ v' \end{pmatrix}:$$

digital video image coordinate of a point on a transformation object video image (home position or origin is the center of video image)

φ: Angle of elevation of optical axis of camera, a following relation is established.

$$s\begin{pmatrix} u' \\ v' \\ f \end{pmatrix} = \begin{pmatrix} 1 & 0 & 0 \\ 0 & \cos\phi & -\sin\phi \\ 0 & \sin\phi & \cos\phi \end{pmatrix}\begin{pmatrix} u \\ v \\ f \end{pmatrix}$$

Here, (s) is scalar. As the above-mentioned equation, for example, it is permissible to use one described in "2.3 Projection Matrix and external variable" on page 187 of "Three-Dimensional Vision" written by Go Jo, Saburo Tsuji, published by KYORITSU SHUPPAN.

Next, a target local region (4m in FIG. 5 for example) is selected and the video image is subjected to rotational transformation so that the local region is located in the center of the vide image (for example, home position of X, Z coordinates of FIG. 5).

Figure 6:
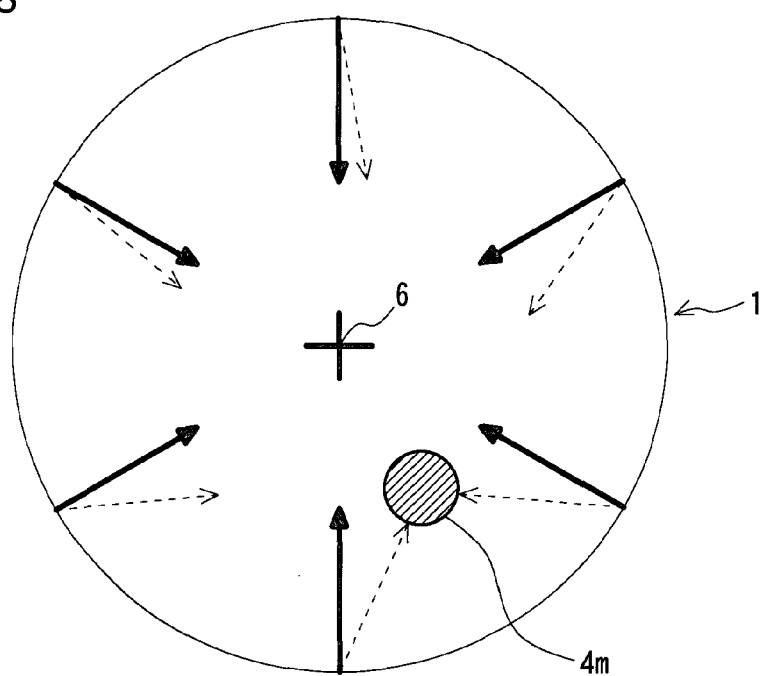
FIG. 6 is an explanatory diagram of actual positional relation (solid line arrow) and rotational transformation (dotted line arrow) of the sight line in case where the local region where an object exists is not located in the center.

Here, assume that cameras are disposed on a circumference or on a rectangle around the real zone, N is a quantity of cameras, (n) is ID of the camera, $R_n$ is a distance from the center to a nth camera and $\Theta_n$ is an azimuth angle of the optical axis of the nth camera. If the cameras are disposed on the circumference, $R_n$ becomes a constant value (FIG. 6). On the other hand, if the camera is disposed on a rectangle, $R_n = H/(2\cos\Theta_n)$ or $R_n = V/(2\cos\Theta_n)$ is expressed, where H, V are width and length of the rectangle.

Generally, the direction of the optical axis of the camera does not agree with the direction (direction of dotted line arrow of FIG. 6) of an object (and a local region including it) Therefore, the direction of the optical axis of the camera is corrected.

Figure 7:
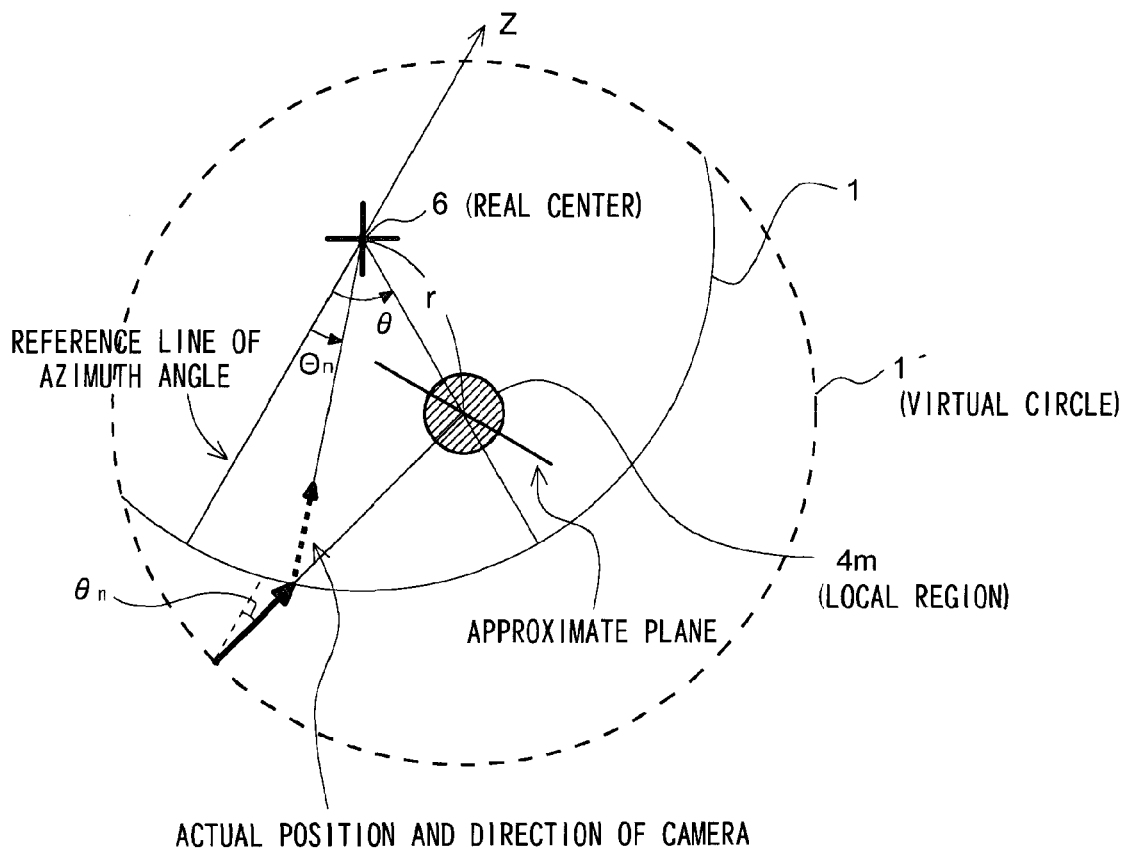
FIG. 7 is an explanatory diagram of virtual circle and each azimuth angle.

If it is assumed that as shown in FIG. 7, the Z-axis is a reference line of the azimuth angle, $\theta_n$ is a corrected azimuth angle of the optical axis of the nth camera, $\theta$ is a azimuth angle of the position of an object of 4 $m$, $\Theta_n$ is an azimuth angle of the optical axis of the nth camera and (r) is a distance from the center to the object and $r_n = r/R_n$ (indicates a value of the ratio of a distance from the center to the object with respect to $R_n$) a following equation is established.

$$\tan\theta_n = \frac{\sin\Theta_n - r_n\sin\theta}{\cos\Theta_n - r_n\cos\theta}$$

Therefore, $$\theta_n = \arctan\left(\frac{\sin\Theta_n - r_n\sin\theta}{\cos\Theta_n - r_n\cos\theta}\right)$$

Figure 8:
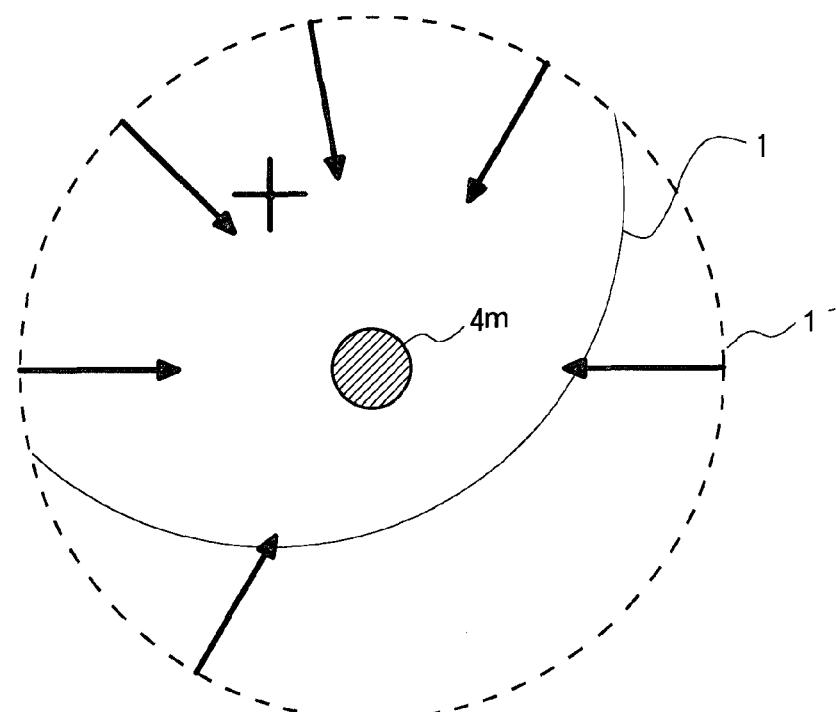
FIG. 8 is an explanatory diagram of a case where rotation transformation is carried out such that the object is located in the center of a divided local region virtual circle.

Accordingly, if a video image is subjected to rotational transformation by an angle $(\theta_n - \Theta_n)$ obtained from the above-mentioned equation, it comes that the local region of 4 $m$ is located in the center of a virtual circle l' as shown in FIG. 8.

Next, a method for obtaining a video image subjected to rotational transformation by the angle $(\theta_n - \Theta_n)$ will be described below.

If it is assumed that:

$$\begin{pmatrix} u_n \\ v_n \end{pmatrix}:$$

digital video image coordinate of a point on original video image (home position is the center of video image)

$$\begin{pmatrix} u'_n \\ v'_n \end{pmatrix}:$$

digital video image coordinate of a point on a transformation object video image (home position is the center of video image), a following relation is established.

$$s\begin{pmatrix} u'_n \\ v'_n \\ f \end{pmatrix} = \begin{pmatrix} \cos(\theta_n - \Theta_n) & 0 & \sin(\theta_n - \Theta_n) \\ 0 & 1 & 0 \\ -\sin(\theta_n - \Theta_n) & 0 & \cos(\theta_n - \Theta_n) \end{pmatrix}\begin{pmatrix} u_n \\ v_n \\ f \end{pmatrix}$$

where (s) is a scalar. If the above-mentioned relational equation is solved (scalar (s) is deleted), the transformation equation for digital video image coordinate is as follows.

$$\begin{pmatrix} u'_n \\ v'_n \end{pmatrix} = \begin{pmatrix} f\frac{u_n\cos(\theta_n - \Theta_n) + f\sin(\theta_n - \Theta_n)}{-u_n\sin(\theta_n - \Theta_n) + f\cos(\theta_n - \Theta_n)} \\ f\frac{v_n}{-u_n\sin(\theta_n - \Theta_n) + f\cos(\theta_n - \Theta_n)} \end{pmatrix}$$

-continued
$$= \begin{pmatrix} f\frac{u_n\{1 - r\cos(\Theta_n - \theta)\} + fr\sin(\Theta_n - \theta)}{-u_n r\sin(\Theta_n - \theta) + f\{1 - r\cos(\Theta_n - \theta)\}} \\ f\frac{v_n\sqrt{1 + r^2 - 2r\cos(\Theta_n - \theta)}}{-u_n r\sin(\Theta_n - \theta) + f\{1 - r\cos(\Theta_n - \theta)\}} \end{pmatrix}$$

The video image is subjected to rotational transformation based on the above equation in order to generate a video image of the object which is moved up to the center of the video image.

Next, if the video image is only subjected to rotational transformation, the sizes of the objects at each viewpoint differ for the reason that a distance from the camera to the object is different. Then, the video image is enlarged or contracted with the home position thereof (center of the video image) fixed so as to arrange the sizes of the objects to an identical one.

Because the size of the object within the video image of each viewpoint is inversely proportional to a distance from the camera to the object, its enlargement/contraction ratio can be calculated according to a following equation.

$$\frac{\sqrt{R_n^2 + r^2 - 2R_n r\cos(\Theta_n - \theta)}}{R_n} = \sqrt{1 + r_n^2 - 2r_n\cos(\Theta_n - \theta)}$$

If $$\begin{pmatrix} u''_n \\ v''_n \end{pmatrix}$$

is digital video image coordinate of a point on enlarged/contracted video image, a following equation is established.

$$\begin{pmatrix} u''_n \\ v''_n \end{pmatrix} = \sqrt{1 + r_n^2 - 2r_n\cos(\Theta_n - \theta)}\begin{pmatrix} u'_n \\ v'_n \end{pmatrix}$$

If the above-mentioned video image is subjected to rotational transformation and enlarged or contracted, a following equation is obtained.

$$\begin{pmatrix} u''_n \\ v''_n \end{pmatrix} =$$

$$\begin{pmatrix} f\sqrt{1 + r_n^2 - 2r_n\cos(\Theta_n - \theta)}\frac{u_n\{1 - r_n\cos(\Theta_n - \theta)\} + fr_n\sin(\Theta_n - \theta)}{-u_n r_n\sin(\Theta_n - \theta) + f\{1 - r_n\cos(\Theta_n - \theta)\}} \\ f\{1 + r_n^2 - 2r_n\cos(\Theta_n - \theta)\}\frac{v_n}{-u_n r_n\sin(\Theta_n - \theta) + f\{1 - r_n\cos(\Theta_n - \theta)\}} \end{pmatrix}$$

Next, a cylindrical record ray space is constructed using the transformed video image. First, the ray space will be described.

Figure 9:
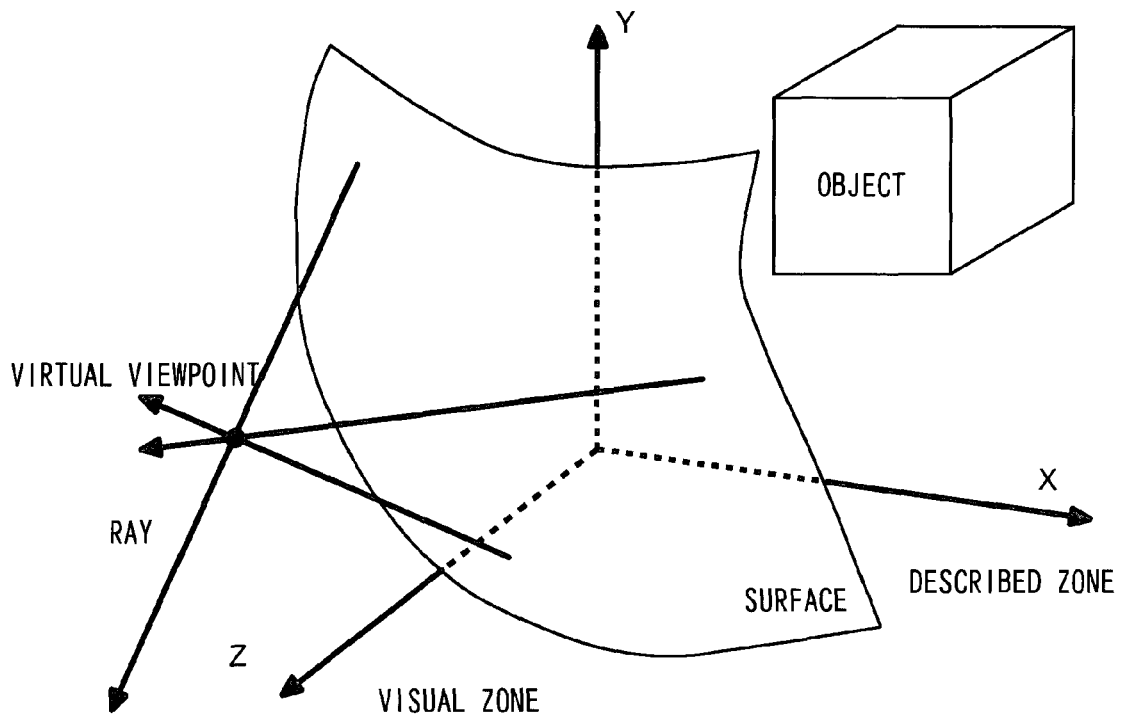
FIG. 9 is an explanatory diagram of description about ray information based on projection of ray.

Consider a case where the real zone is divided to "described zone" and "visual zone" by a boundary surface S as shown in FIG. 9. Assume that ray advances straight in the real zone without being affected by interference or damping. The video image when the viewpoint is placed at a position of the local region of (4$m$) in FIG. 8 can be synthesized virtually by collecting ray information which passes through the boundary surface S of FIG. 9 and reaches the local region of (4$m$).

Further, a projection method not depending on the shape of the boundary surface S can be defined. First, if an axis is placed in an advance direction of ray, it comes that changes accompanied by propagation of the ray is recorded along this axis. This axis is called R axis and as a position coordinate system containing the R axis instead of the XYZ coordinate system, PQR coordinate system is considered. Information of passage position of ray along the R axis can be described.

Figure 10:
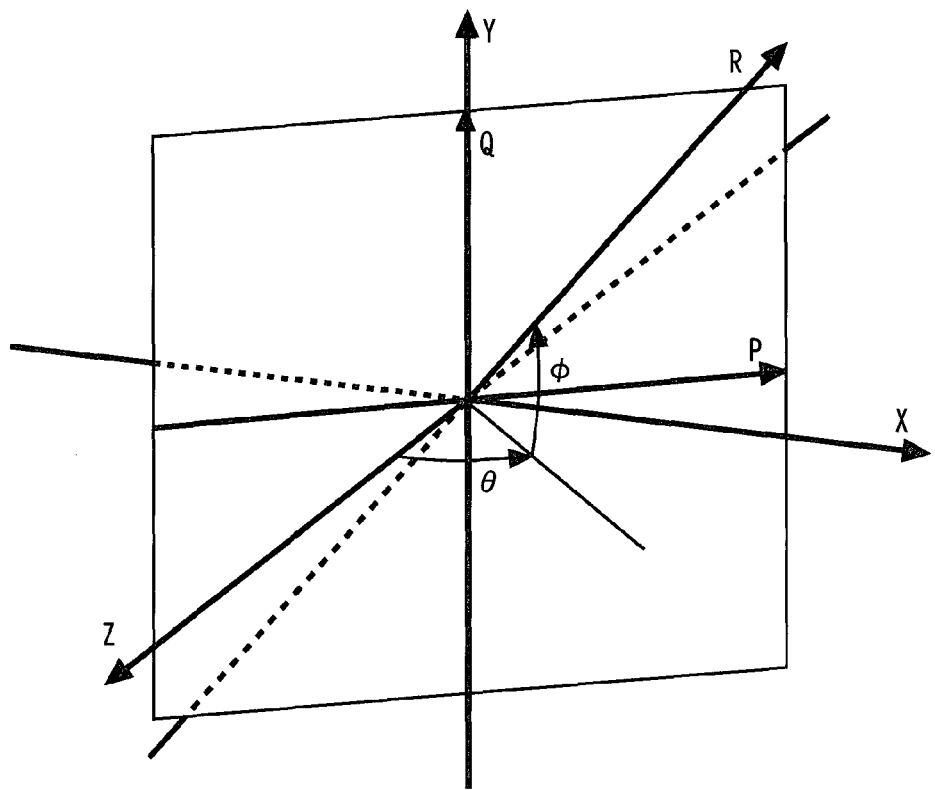
FIG. 10 is an explanatory diagram of definition of cylindrical ray space coordinate system.

More specifically, as shown in FIG. 10, after the X axis, Y axis and Z axis are rotated by θ around the Y axis and then, only the Z axis is rotated by φ around the X axis, they are defined as P, Q, R axis respectively. Information of ray which propagates the position (X, Y, Z) in a direction of (θ, φ) may be recorded at a position (P, Q) obtained according to following transformation equations.

$$P = X \cos \theta - Z \sin \theta$$

$$Q = -X \sin \theta \tan \phi + Y - Z \cos \theta \tan \phi$$

By this transformation, it comes that information of orthographic projection of zone is recorded in the PQ plane. If P and Q of the transformation equation is used, five-dimensional ray space f (X, Y, Z, θ, φ) is transformed to four-dimensional ray space f (P, Q, θ, φ).

Video image information can be regarded as "collection of information of ray passing through a point in real zone". Thus, to store information of video image photographed at a camera position (Xc, Yc, Zc) in ray space, ray information recorded in a region represented by equation f(θ, φ)|X=Xc, Y=Yc, Z=Zc is cut out. Photographing of the video image can be regarded as "sampling of ray information" and the synthesis of the video image can be regarded as "cutout of ray information from ray space".

Figure 11:
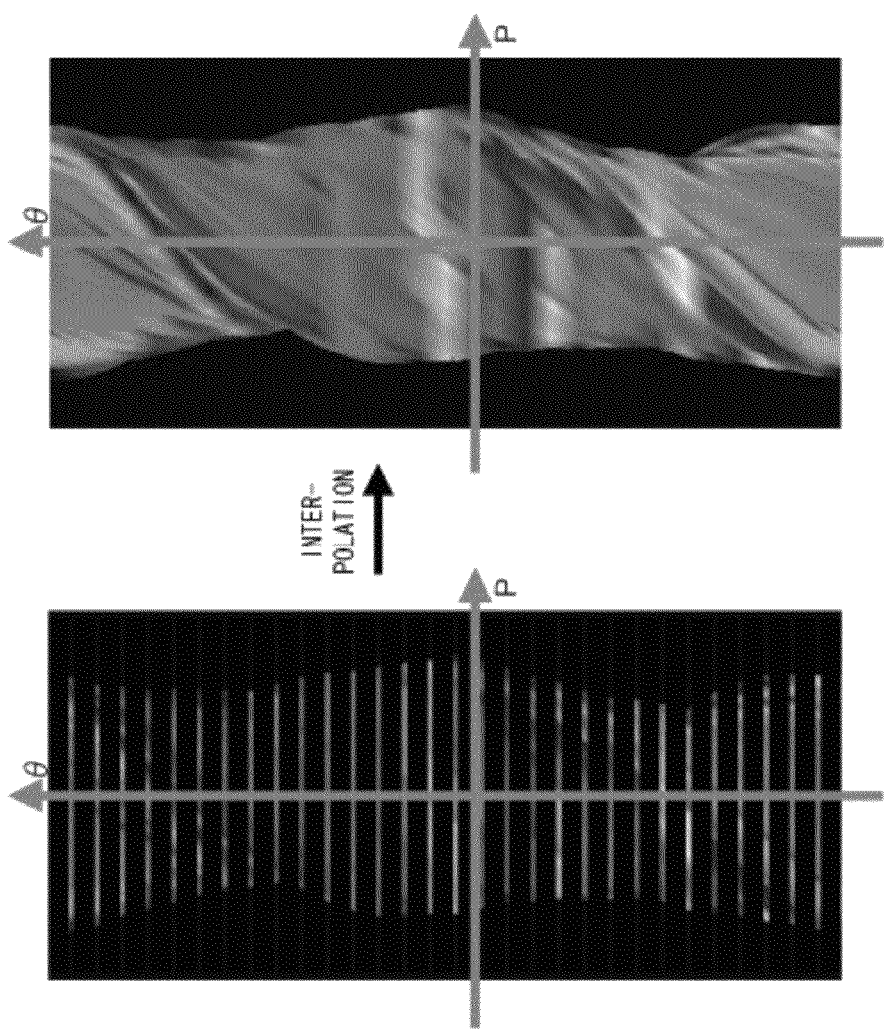
FIG. 11 is a diagram showing a specific example of interpolation processing of ray space.

In case of ray space f(P, Q, θ, φ) projected to the 4-dimension, camera photographing position (Xc, Yc, Zc) and ray direction (θc, φc) are substituted to the above-mentioned two transformation equations so as to obtain (Pc, Qc) and information of ray photographed is stored in (Pc, Qc, θc, φc). FIG. 11 shows an example of the ray space. This indicates Pθ plane for convenience of description. The horizontal axis is P axis and the vertical axis is θ axis.

Ray information of video image photographed at a certain fixed point is stored in the form of sine curve on the Pθ surface as evident if X and Z are assumed to be constant in the first equation of the above-mentioned two transformation equations. Photographed image used for synthesis of the ray space of FIG. 11 is a circumference multi-viewpoint video image photographed by a camera disposed on the circumference toward the center and shows ray information of sine curve regions arranged.

To synthesize a video image from an arbitrary virtual viewpoint, ray information of an appropriate region is cut out from a constructed ray space. The region from which it is cut out is expressed as f(P0, Q0, θ₀, φ₀) by using the (P₀, Q₀) obtained by substituting the viewpoint position (X₀, Y₀, Z₀) and ray direction (θ₀, φ₀).

In theory, video image from an arbitrary viewpoint point can be synthesized using the above-described methods. In reality, it is difficult to photograph information of all rays and in an actual photographing, sparse ray space as shown in the left diagram of FIG. 11 is constructed. This drawing is an example of a case of using 30 cameras disposed sparsely, in which 30 piece of rays in a horizontal direction of the left diagram correspond to rays photographed by 30 cameras. Thus, it is necessary to synthesize information of rays not photographed by estimating virtually. By filling the ray space f (P, Q, θ, φ) preliminarily, this problem is solved.

A result of interpolation of the Pθ section of the ray space of the left diagram of FIG. 11 is shown in the right diagram of FIG. 11. In this right diagram, a dense ray space reflecting its constructive property is obtained from the sparse ray space as shown in the left diagram of FIG. 11 and if ray corresponding to an arbitrary virtual viewpoint position is taken out of this ray space, ray (image) of the virtual viewpoint is obtained. In the meantime, regions of similar colors and brightness are arranged on the sine curve on the Pθ section of the ray space.

After interpolation is carried out using the ray space representation method as described above, inverse transformation is carried out to a video image as seen from the virtual viewpoint to the local region. More specifically, transformation according to a following equation is carried out.

$$\begin{pmatrix} u_i \\ v_i \end{pmatrix} = \begin{pmatrix} f \dfrac{u'_i \{1 - r_i \cos(\Theta_i - \theta)\} - f\sqrt{1 + r_i^2 - 2r_i \cos(\Theta_i - \theta)} r_i \sin(\Theta_i - \theta)}{u'_i r_i \sin(\Theta_i - \theta) + f\sqrt{1 + r_i^2 - 2r_i \cos(\Theta_i - \theta)} \{1 - r_i \cos(\Theta_i - \theta)\}} \\ f \dfrac{v'_i \sqrt{1 + r_i^2 - 2r_i \cos(\Theta_i - \theta)}}{u'_i r_i \sin(\Theta_i - \theta) + f\sqrt{1 + r_i^2 - 2r_i \cos(\Theta_i - \theta)} \{1 - r_i \cos(\Theta_i - \theta)\}} \end{pmatrix}$$

where Θ is an azimuth angle of a virtual viewpoint, θ is an azimuth angle of the central axis of a cylinder of a local region to which attention is paid, R1 is a distance from a home position of an object zone to a virtual viewpoint while $r_i = r/R_i$. Moreover, $$\begin{pmatrix} u'_i \\ v'_i \end{pmatrix}$$

is digital video image coordinate of a point on interpolated video image (home position is the center of video image).

$$\begin{pmatrix} u_i \\ v_i \end{pmatrix}$$

is digital video image coordinate of a point on virtual viewpoint video image (home position is the center of video image).

By multiplying the ratio of a distance (height of virtual viewpoint in case where a horizontal plane where a camera is disposed is regarded as a reference) from a plane where a camera is disposed to a virtual viewpoint to the distance in the direction of sight line from the center of an object to which attention is paid (central axis of a cylinder of the local region to which attention is paid) to the virtual viewpoint, by an amount of pixel transformation of the focal length of the camera, a travel distance of the coordinate of the center of the virtual viewpoint video image of the local region to which attention is paid (its travel direction is reverse) is obtained and then, the position in the vertical direction of the coordinate is displayed by moving it by only the above-mentioned travel distance.

That is, the travel distance of the virtual viewpoint video image of each local region is obtained based on the distance in the direction of sight line from the center of the object to which attention is paid (central axis of the cylinder of the local region to which attention is paid) to the virtual viewpoint and the distance from the horizontal plane (horizontal surface) where the camera is disposed up to the virtual viewpoint (height of the virtual viewpoint in case where the horizontal plane where the camera is disposed is regarded as a reference). This travel distance can be obtained from a following equation.

$$\Delta v_i = -f \frac{y_i}{1 - r_i \cos(\Theta_i - \theta)}$$

Where $\Delta v_i$ is a travel distance of the virtual viewpoint video image of a local region to which attention is paid, (f) is an amount of pixel transformation of the focal length of a camera, $y_i = Y_i/R_i$ where $R_i$ is a distance from home position of object zone to virtual viewpoint, $Y_i$ is a distance from a horizontal plane where a camera is disposed to the virtual viewpoint, $r_i = r/R_i$ where (r) is a distance from home position of object zone to the central axis of a cylinder of a local region to which attention is paid, where $\Theta_i$ is an azimuth angle of virtual viewpoint and $\theta$ is an azimuth angle of the central axis of the cylinder of the local region to which attention is paid.

From the above description, as regards the virtual viewpoint video image of each local region, it is made evident that this travel distance $\Delta v_i$ is inversely proportional to a distance in the direction of sight line from the center of the object to which attention is paid up to the virtual viewpoint and proportional to a distance from a horizontal plane where a camera is disposed to the virtual viewpoint (travel distance in a vertical direction of the camera). However, the direction of travel is inverse.

Next, if the coordinate of the center of the virtual viewpoint video image of the local region to which attention is paid within the free viewpoint video image to be synthesized finally is assumed to be $(u_i, v_i)$, the free viewpoint video image is synthesized by overwriting from a local region deeper from the virtual viewpoint to a forward local region while that v coordinate is moved by $\Delta v_i$ to obtain $(u_i, v_i + \Delta v_i)$. In the meantime, by omitting drawing of the local region which is preliminarily expected to be overwritten later, from the beginning, the processing can be accelerated. By including the equation 15 in the equation 13, a following equation can be obtained.

$$\begin{pmatrix} u_i \\ v_i \end{pmatrix} = \begin{pmatrix} f \dfrac{u_i'\{1 - r_i \cos(\Theta_i - \theta)\} - f\sqrt{1 + r_i^2 - 2r_i \cos(\Theta_i - \theta)}\, r_i \sin(\Theta_i - \theta)}{u_i' r_i \sin(\Theta_i - \theta) + f\sqrt{1 + r_i^2 - 2r_i \cos(\Theta_i - \theta)}\, \{1 - r_i \cos(\Theta_i - \theta)\}} \\ f \dfrac{v_i'\sqrt{1 + r_i^2 - 2r_i \cos(\Theta_i - \theta)}}{u_i' r_i \sin(\Theta_i - \theta) + f\sqrt{1 + r_i^2 - 2r_i \cos(\Theta_i - \theta)}\, \{1 - r_i \cos(\Theta_i - \theta)\}} + f \dfrac{y_i}{1 - r_i \cos(\Theta_i - \theta)} \end{pmatrix}$$

Figure 12:
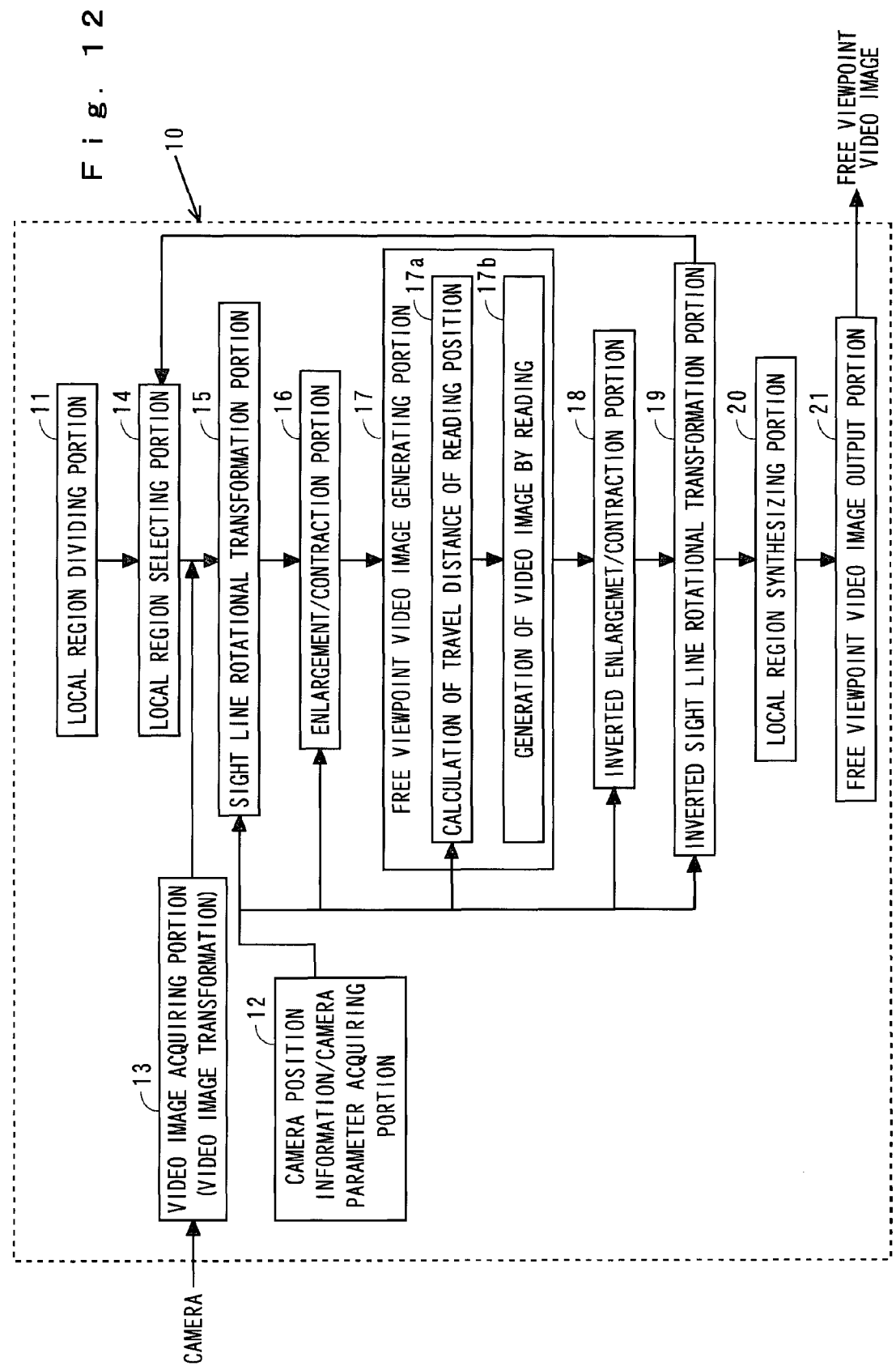
FIG. 12 is a block diagram showing the structure of a second embodiment of the free viewpoint video image generating apparatus of the present invention.

Next, the second embodiment of the present invention will be described. FIG. 12 is a block diagram showing the structure of the free viewpoint video image generating apparatus of the second embodiment. In this block diagram, reference numeral 17a indicates calculation processing for the travel distance of a reading position and reference numeral 17b indicates image generating processing by reading, while other reference numerals indicate identical or equivalent portions to in FIG. 2. This second embodiment is different from the first embodiment in that the processing of moving the display position of each local region depending on a travel distance in which the camera is moved vertically is carried out by the free viewpoint video image generating portion 17 without being carried out by the local region synthesizing portion 20 like the first embodiment.

Then, the processing of the free viewpoint video image generating portion 17 of the present embodiment will be described below. If the position of the virtual viewpoint is located at a position apart from the plane where the camera is disposed, the ratio of a distance (height of the virtual point in case where the horizontal plane where the camera is disposed is regarded as reference) from the plane where the camera is disposed to the virtual viewpoint to the distance in the direction of sight line from the center of the object to which attention is paid (central axis of the cylinder of the local region to which attention is paid) up to the virtual viewpoint is multiplied by a ratio of transformation from the real zone to the ray space. As a result, a travel distance on the reading position the ray space of the local region to which attention is paid is obtained and a position for reading the ray information from the ray space of the local region is read in by moving it by the above-mentioned travel distance.

That is, for the virtual viewpoint video image of each local region, its reading position is obtained based on the distance from the center of the object to which attention is paid (central axis of the cylinder of the local region to which attention is paid) to the virtual viewpoint and the distance from the plane (horizontal plane) where the camera is disposed to the virtual viewpoint, i.e. height of the virtual point in case where the horizontal plane where the camera is disposed is regarded as reference. This reading position can be obtained according to a following equation.

$$Q' = Q + \frac{Y_i}{1 - r_i \cos(\Theta_i - \theta)}$$

where Q' is a reading position for the ray space of the local region to which attention is paid if the virtual viewpoint is not located on the plane where the camera is disposed, Q is a reading position for the ray space of the local region to which attention is paid if the virtual viewpoint is located on the plane where the camera is disposed, $Y_i$ is a distance from the plane where the camera is disposed to the virtual viewpoint, $\Theta_1$ is an azimuth angle of the virtual viewpoint, $\theta$ is an azimuth angle of the central axis of the cylinder of the local region to which attention is paid, and $r_i = r/R_i$ where (r) is a distance from the home position of the object zone to the central axis of the cylinder of the local region to which attention is paid and $R_i$ is a distance form the home position of the object zone to the virtual viewpoint.

From the above description, for the virtual viewpoint video image of each local region, it is evident that its reading position is inversely proportional to a distance in the direction of sight line from the center of an object to which attention is paid to the virtual viewpoint and that it needs to be moved by an amount proportional to the distance from the plane where the camera is disposed up to the virtual viewpoint (travel distance in the vertical direction of the camera).

Figure 2:
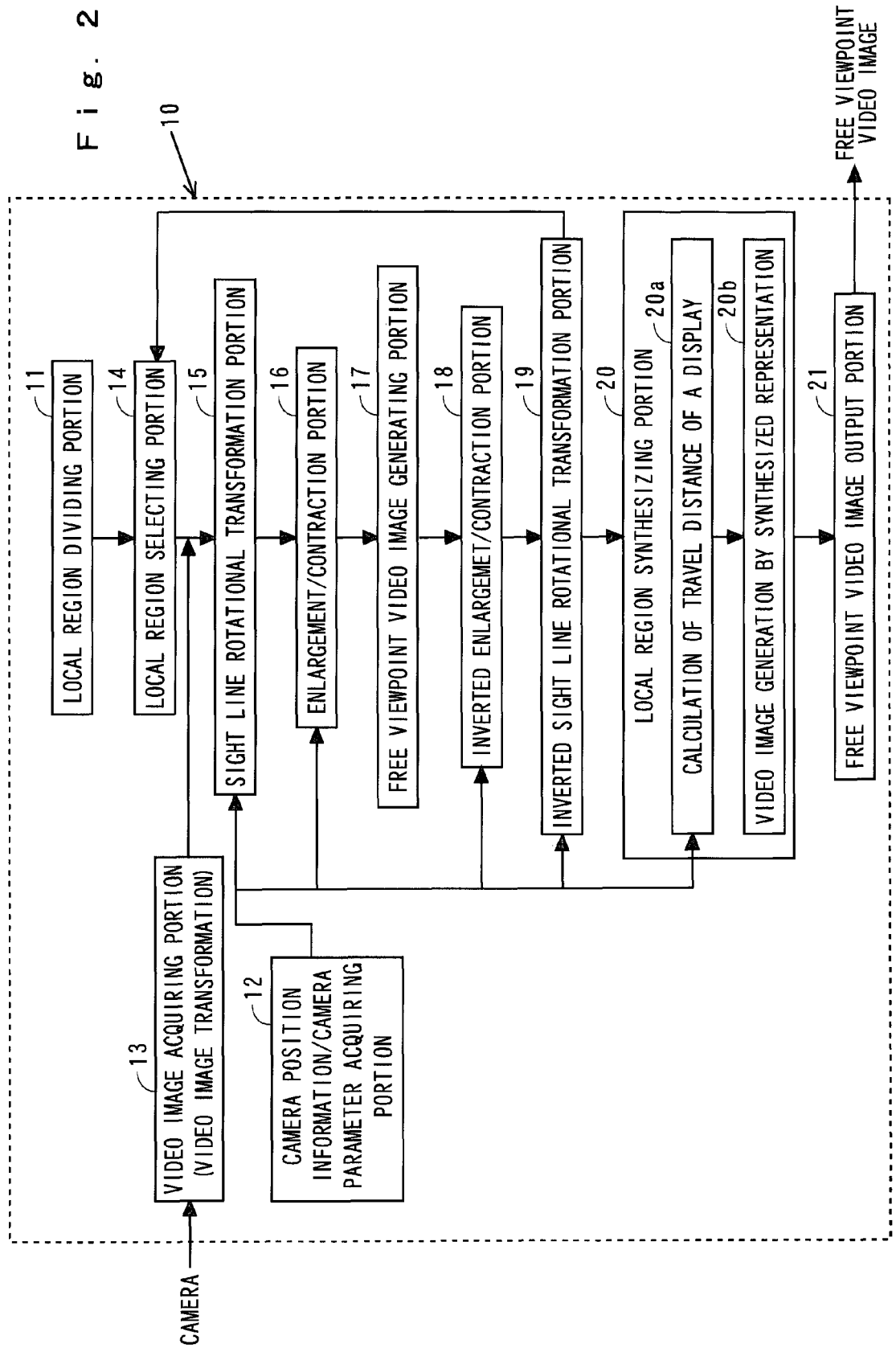
FIG. 2 is a block diagram showing the structure of the first embodiment of a free viewpoint video image generating apparatus of the present invention.

After interpolation is carried out according to the ray space representation method as described above, inverse transformation is executed on a video image when the local region is viewed from the virtual viewpoint (steps S18 and 19 of FIG. 2). More specifically, transformation based on a following equation is carried out.

$$\begin{pmatrix} u_i \\ v_i \end{pmatrix} = \begin{pmatrix} f \dfrac{u_i'\{1 - r_i\cos(\Theta_i - \theta)\} - f\sqrt{1 + r_i^2 - 2r_i\cos(\Theta_i - \theta)}\, r_i\sin(\Theta_i - \theta)}{u_i' r_i \sin(\Theta_i - \theta) + f\sqrt{1 + r_i^2 - 2r_i\cos(\Theta_i - \theta)}\,\{1 - r_i\cos(\Theta_i - \theta)\}} \\ f \dfrac{v_i'\sqrt{1 + r_i^2 - 2r_i\cos(\Theta_i - \theta)}}{u_i' r_i \sin(\Theta_i - \theta) + f\sqrt{1 + r_i^2 - 2r_i\cos(\Theta_i - \theta)}\,\{1 - r_i\cos(\Theta_i - \theta)\}} \end{pmatrix}$$

where $\Theta_i$ is an azimuth angle of the virtual viewpoint, $\theta$ is an azimuth angle of the central axis of the cylinder of the local region to which attention is paid, $R_i$ is a distance from the home position of the object zone up to the virtual viewpoint while $r_i = r/R_i$.

The processing of the second embodiment other than described above is the same as the invention mentioned previously (Japanese Patent Application No. 2006-185648) and thus description thereof is omitted.

Figure 13:
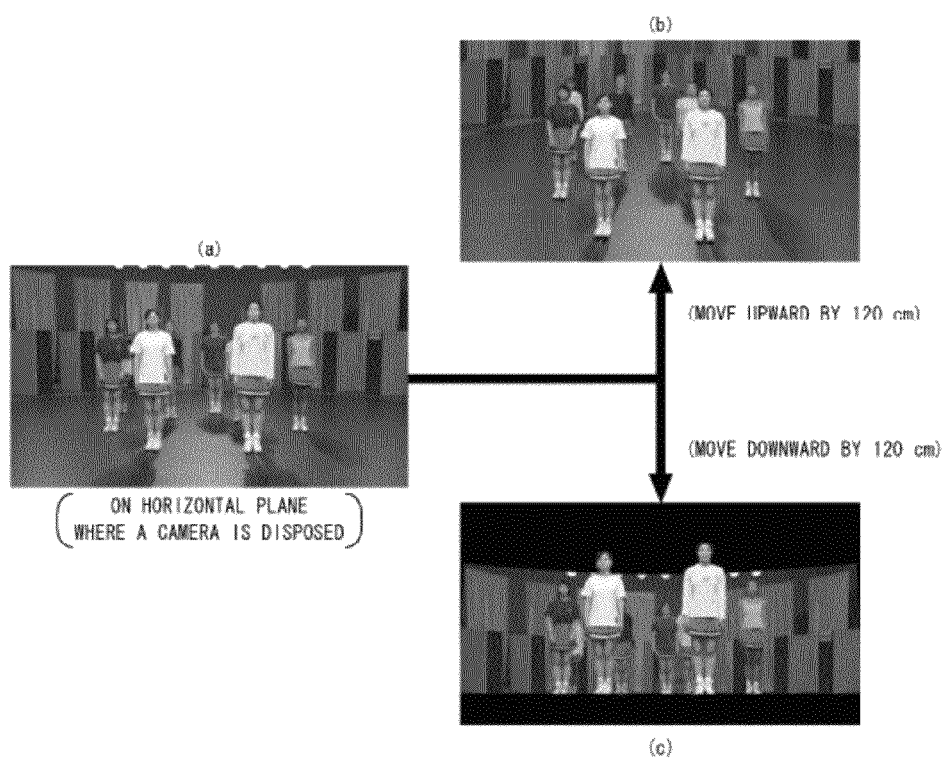
FIG. 13 is a diagram showing a specific example of generation result of free viewpoint video image and actual viewpoint video image.

FIG. 13 is a diagram showing an example of a result of practical simulation by applying the present invention. (a) is a video image on a horizontal plane of a first stage where a camera is disposed, (b) is a video image when the camera is moved upward by 120 cm and (c) is a video image when the camera is moved downward by 120 cm. If the camera is moved upward from the state of (b), evidently, a forward image is descended largely and the degree of descent of the video image is decreased as it goes deeper. Further, if the camera is moved downward from the state of (c), evidently, the forward image is ascended largely and the ascent of the image is decreased as it goes deeper. This coincides with it that the travel distance $\Delta v_i$ and the reading position Q' expressed in the equation 15 and equation 17 are inversely proportional to a distance in the direction of sight line from the center of the object to which attention is paid to the virtual viewpoint.

As described above, according to the present invention, the virtual viewpoint video image viewed from the virtual viewpoint not located on the plane where the camera is disposed can be obtained. Consequently, any video images from the virtual viewpoint moved in any direction in terms of three-dimension can be generated.

What is claimed is:

1. A free viewpoint video image generating method which generates a video image of an arbitrary viewpoint using video images of a object photographed by a plurality of cameras, each having a horizontal optical axis disposed to surround the object, comprising:
    a first step of dividing a real zone to local regions;
    a second step of transforming a camera coordinate system of the camera using an internal parameter of the camera within each of the local regions so that the optical axis of the camera is directed to the local region;
    a third step of enlarging or contracting the video image within the local region using information of distance between each of the cameras and the object, so that scales of the local regions on the video image are arranged to be identical;
    a fourth step of generating a free viewpoint video image only within the local region using a method of image based rendering within each of the local regions;
    a fifth step of enlarging or contracting the free viewpoint video image within each of the local regions so that the local region on the video image is of a prescribed scale;
    a sixth step in which the coordinate system of each camera is transformed using an internal parameter of the camera so that the optical axis of the camera is directed to a prescribed optical axis, so as to obtain the free viewpoint video image of the local region; and
    a seventh step of integrating the free viewpoint video image of each of the local region, wherein
    to generate a free viewpoint video image, viewed from a virtual viewpoint not located on a plane where the camera is disposed, moving a position of the virtual viewpoint video image of for each of the local regions within the free viewpoint video image for synthesis at the position of the virtual viewpoint is carried out in the seventh step or moving a position Q of information of ray to be read corresponding to the position of the virtual viewpoint is carried out in the fourth step.

2. The free viewpoint video image generating method according to claim 1,
    wherein in the seventh step, if the position of the virtual viewpoint is located apart from the plane where the camera is disposed, a ratio of the height of the virtual viewpoint in case where the horizontal plane where the camera is disposed is regarded as a reference, which is a distance from the plane where the camera is disposed to the virtual viewpoint, to the distance in the direction of sight line from the central axis of a cylinder of a local region or the center of the object to which attention is paid to the virtual viewpoint is multiplied by an amount of pixel transformation of the focal length of the camera to obtain a travel distance of the coordinate of the center of the free viewpoint video image of the local region to which attention is paid and the position in a vertical direction of the coordinate is moved by the travel distance and displayed.

3. The free viewpoint video image generating method according to claim 1,
    wherein in the fourth step, if the position of the virtual viewpoint is located apart from the plane where the camera is disposed, a ratio of the height of the virtual viewpoint in case where the horizontal plane where the camera is disposed is regarded as a reference, which is a distance from the plane where the camera is disposed to the virtual viewpoint, to the distance in the direction of sight line from the central axis of a cylinder of the local region or the center of the object to which attention is paid to the virtual viewpoint is multiplied by a ratio of transformation from the real zone to ray space so as to obtain a travel distance of a reading position of the ray space of the local region to which attention is paid and the position for reading ray information from the ray space of the local region is moved by the travel distance so as to read the ray information.

* * * * *